US012265216B2

(12) United States Patent
Valera (10) Patent No.: US 12,265,216 B2
(45) Date of Patent: Apr. 1, 2025

(54) DEVICE FOR AUGMENTED REALITY OR VIRTUAL REALITY DISPLAY (71) Applicant: Snap Inc., Santa Monica, CA (US)

(72) Inventor: Mohmed Salim Valera, Abingdon (GB)

(73) Assignee: Snap Inc., Santa Monica, CA (US)

( * ) Notice: Subject to any disclaimer, the term of this patent is extended or adjusted under 35 U.S.C. 154(b) by 670 days.

(21) Appl. No.: 17/279,016

(22) PCT Filed: Aug. 7, 2019

(86) PCT No.: PCT/GB2019/052210
§ 371 (c)(1),
(2) Date: Mar. 23, 2021

(87) PCT Pub. No.: WO2020/065251
PCT Pub. Date: Apr. 2, 2020

(65) Prior Publication Data
US 2022/0075185 A1    Mar. 10, 2022

(30) Foreign Application Priority Data

Sep. 24, 2018    (GB) ...................................... 1815516

(51) Int. Cl.
*G02B 27/00*    (2006.01)
*G02B 1/02*    (2006.01)
(Continued)

(52) U.S. Cl.
CPC ........... *G02B 27/0081* (2013.01); *G02B 6/34* (2013.01); *G02B 27/0172* (2013.01);
(Continued)

(58) Field of Classification Search
CPC .. G02B 27/0081; G02B 6/34; G02B 27/0172; G02B 27/0944; G02B 27/4272;
(Continued)

(56) References Cited

U.S. PATENT DOCUMENTS 6,580,529 B1    6/2003    Amitai et al.
11,487,111 B2 *   11/2022    Grey ................... G02B 6/0036
(Continued)

FOREIGN PATENT DOCUMENTS

CN    101799569    8/2010
CN    101915992    12/2010
(Continued)

OTHER PUBLICATIONS

"Chinese Application Serial No. 201980062808.3, Office Action mailed May 7, 2022", w/ English Translation, 12 pgs.
(Continued)

*Primary Examiner* — Sharrief I Broome
*Assistant Examiner* — K Muhammad
(74) *Attorney, Agent, or Firm* — Schwegman Lundberg & Woessner, P.A.

(57) ABSTRACT

A device is disclosed comprising a waveguide (2; 102), an input diffractive optical structure (4; 104) configured to receive light from a projector and couple the received light into the waveguide and an output diffractive optical structure (10; 110). An intermediate diffractive optical structure (6, 8; 106) is configured to receive light from the input diffractive optical structure (4; 104), provide a one-dimensional expansion of the received light, and couple the expanded light towards the output diffractive optical structure (10; 110). The output diffractive optical structure (10; 110) is configured to receive light from the intermediate diffractive optical structure and couple it towards a viewer. The intermediate diffractive optical structure (6, 8; 106) comprises diffractive features that are oriented at a first angle to light received from the input diffractive optical structure to provide a first diffraction and a second diffraction within the intermediate diffractive optical structure in order to couple light towards the output diffractive optical structure. The first diffraction (Continued)

couples light from the input diffractive optical structure towards the diffractive features at a second angle so that the second diffraction is provided at a plurality of spaced positions in the intermediate diffractive optical structure thereby providing the one-dimensional expansion of light. The second diffraction couples light towards the output diffractive optical structure.

20 Claims, 7 Drawing Sheets (51) Int. Cl.
  *G02B 6/34* (2006.01)
  *G02B 27/01* (2006.01)
  *G02B 27/09* (2006.01)
  *G02B 27/42* (2006.01)
(52) U.S. Cl.
  CPC ..... *G02B 27/0944* (2013.01); *G02B 27/4272* (2013.01); *G02B 1/02* (2013.01); *G02B 2027/0123* (2013.01)
(58) Field of Classification Search
  CPC .............. G02B 1/02; G02B 2027/0123; G02B 2027/0125; G02B 2027/0174; G02B 6/124; G02B 5/1819; G02B 27/0101; G02B 2027/011; G02B 2027/0116
  See application file for complete search history.

(56) References Cited

U.S. PATENT DOCUMENTS

| | | |
|---|---|---|
| 2010/0321781 A1 | 12/2010 | Levola et al. |
| 2011/0019874 A1* | 1/2011 | Jarvenpaa ............... A61B 3/113 |
| | | 382/103 |
| 2017/0299865 A1 | 10/2017 | Vallius et al. |
| 2017/0322426 A1 | 11/2017 | Tervo |
| 2018/0113309 A1 | 4/2018 | Robbins et al. |
| 2018/0172995 A1 | 6/2018 | Lee et al. |
| 2021/0173480 A1* | 6/2021 | Osterhout ........... G06F 3/04815 |
| 2022/0206295 A1* | 6/2022 | Calafiore ............. G02B 5/1828 |

FOREIGN PATENT DOCUMENTS

| | | | |
|---|---|---|---|
| CN | 101945612 | 1/2011 | |
| CN | 211348856 U | 8/2020 | |
| CN | 112752991 A | 5/2021 | |
| CN | 112752991 B | 10/2022 | |
| EP | 3857287 A1 | 8/2021 | |
| EP | 3857287 B1 | 12/2022 | |
| GB | 2556094 | 5/2018 | |
| GB | 2556094 A * | 5/2018 | ......... G02B 27/0081 |
| GB | 2577327 A | 3/2020 | |
| TW | 202014758 A | 4/2020 | |
| TW | 1797374 B | 4/2023 | |
| WO | 2016020643 | 2/2016 | |
| WO | WO-2017065819 A1 * | 4/2017 | ......... G02B 27/0172 |
| WO | 2018091862 | 5/2018 | |
| WO | 2020065251 | 4/2020 | |

OTHER PUBLICATIONS

"Chinese Application Serial No. 201980062808.3, Response filed Jun. 28, 2022 to Office Action mailed May 7, 2022", w/ English Claims, 9 pgs.
European Search Report dated Mar. 13, 2019 for EP application GB1815516.8.
Internationa Preliminary Report on Patentability dated Nov. 12, 2020 for international application PCT/GB2019/052210.
"International Application Serial No. PCT/GB2019/052210, Written Opinion mailed Sep. 15, 2020", 7 pgs.
"International Application Serial No. PCT/GB2019/052210, Response to Written Opinion filed Nov. 10, 2020 to Written Opinion mailed Sep. 15, 2020", 9 pgs.
"International Application Serial No. PCT/GB2019/052210, International Search Report mailed Nov. 12, 2019", 3 pgs.
"International Application Serial No. PCT/GB2019/052210, Written Opinion mailed Nov. 12, 2019", 6 pgs.
"European Application Serial No. 19753435.7, Response to Communication pursuant to Rules 161(2) and 162 EPC filed Aug. 26, 2021".
"Taiwanese Application Serial No. 108130160, Office Action mailed Jan. 16, 2023", w/ English Machine Translation, 9 pgs.

* cited by examiner

DEVICE FOR AUGMENTED REALITY OR VIRTUAL REALITY DISPLAY

RELATED APPLICATIONS

This application is a national stage filing under 35 U.S.C. § 371 of International Patent Application No. PCT/GB2019/052210, filed Aug. 7, 2019, which claims priority to Great Britain application 1815516.8 filed Sep. 24, 2018, each of which is incorporated by reference herein in its entirety.

The present invention relates to a device for use in an augmented reality or virtual reality display such as a headset or a head-up display. In particular, the invention relates to a waveguide in which an intermediate diffractive optical structure is positioned between an input grating and an output diffractive optical structure. This can improve spatial uniformity of the optical output from the output diffractive optical structure without negatively impacting angular field of view.

An augmented reality display allows a user to view their surroundings as well as projected images. In military or transportation applications the projected images can be overlaid on the real world perceived by the user. Other applications for these displays include video games and wearable devices, such as glasses. By contrast, in a virtual reality display a user can only perceive projected images and light from their real world surroundings is obscured.

In a normal augmented reality set-up a transparent display screen is provided in front of a user so that they can continue to see the physical world. The display screen is typically a glass waveguide and a projector is provided to one side. Light from the projector is coupled into the waveguide by a diffraction grating (an input grating). The projected light is totally internally reflected within the waveguide. The light is then coupled out of the waveguide by another diffraction grating (an output grating) so that it can be viewed by a user. The projector can provide information and/or images that augment a user's view of the physical world.

An optical device is disclosed in WO 2016/020643 for expanding input light in two dimensions in an augmented reality display. An input diffractive optical element is provided for coupling input light from a projector into a waveguide. The optical device also includes an output element having two diffractive optical elements overlaid on one another in the waveguide so that each of the two diffractive optical elements can receive light from the input diffractive optical element and couple it towards the other diffractive optical element in the pair, which can then act as an output diffractive optical element which couples light out of the waveguide towards a viewer. In one embodiment the two diffractive optical elements overlaid on one another are provided in a photonic crystal. This is achieved by having an array of pillars arranged within or on the surfaces the waveguide, having an increased refractive index relative to the surrounding waveguide medium. The pillars in WO 2016/020643 are described as having a circular cross-sectional shape when viewed in the plane of the waveguide, from the perspective of a viewer. This arrangement has been found to be very effective at simultaneously expanding light in two dimensions and coupling light out of the waveguide. Advantageously this can improve the use of space on the waveguide which can decrease the cost of manufacture.

Another optical device is described in U.S. Pat. No. 6,580,529. In this device a first linear holographic optical element is provided for coupling incident light into a substrate waveguide. A second linear holographic optical element is provided at an angle to the light from the first linear holographic element. The second linear holographic optical element provides a single diffraction of light towards a third linear holographic optical element. In this way, the second linear holographic optical element can provide a one-dimensional expansion of light within the substrate waveguide.

An object of the present invention is to improve spatial uniformity from an output element in an augmented reality display or a virtual reality display, while preserving a wide angular field of view.

According to an aspect of the present invention there is provided a device for use in an augmented reality or virtual reality display, comprising: a waveguide; an input diffractive optical structure configured to receive light from a projector and couple the received light into the waveguide; an output diffractive optical structure; and an intermediate diffractive optical structure configured to receive light from the input diffractive optical structure, provide a one-dimensional expansion of the received light, and couple the expanded light towards the output diffractive optical structure, wherein the output diffractive optical structure is configured to receive light from the intermediate diffractive optical structure and couple it towards a viewer; wherein the intermediate diffractive optical structure comprises diffractive features that are oriented at a first angle to light received from the input diffractive optical structure to provide a first diffraction and a second diffraction within the intermediate diffractive optical structure in order to couple light towards the output diffractive optical structure, wherein the first diffraction couples light from the input diffractive optical structure towards the diffractive features at a second angle so that the second diffraction is provided at a plurality of spaced positions in the intermediate diffractive optical structure thereby providing the one-dimensional expansion of light, wherein the second diffraction couples light towards the output diffractive optical structure. Preferably the input diffractive optical element is a diffraction grating.

In this way, light is diffracted twice within the intermediate diffractive optical structure. Optical effects introduced by the first diffraction are counter-acted by the second diffraction. In other words, the double diffraction within the intermediate diffractive optical structure can be self-conjugating.

This approach can allow one-dimensional expansion of light from an input diffractive optical structure without introducing any undesirable optical effects such as chromatic and angular dispersion. This expanded beam can then be coupled towards a viewer using an output optical structure in order to provide augmented reality or virtual reality images over a two-dimensional area.

Preferably the first and second angles are substantially equal. In this way, light can be coupled out of the intermediate diffractive structure in the same direction as it is coupled in because the first and second diffractions can cancel one another out. By providing first and second angles that are equal the first and second diffractions can be precisely self-conjugating so that the chromatic and angular dispersion created by the first diffraction can be counteracted by the second diffraction.

The intermediate diffractive optical structure may comprise first and second linear gratings, wherein the first grating comprises the diffractive features that are oriented at the first angle to light received from the input diffractive optical structure to provide the first diffraction and the second diffraction within the first grating. The second linear grating may comprise diffractive features that are oriented at a third angle to light received from the input diffractive optical structure to provide a third diffraction and a fourth diffraction within the second grating. The third diffraction preferably couples light towards the second grating's diffractive features at a fourth angle so that the fourth diffraction is provided at a plurality of spaced positions in the second grating thereby providing the one-dimensional expansion of light, wherein the fourth diffraction couples light towards the output diffractive optical structure.

Preferably the third and fourth angles are substantially equal. In this way, the first and second gratings can provide respective one-dimensional expansion of light from the input diffractive optical structure, in different directions.

Preferably the first angle and the third angle are substantially equal and opposite. For example, the first angle may be +45° and the third angle may be −45°. In this way, the first and second gratings within the intermediate diffractive optical structure can turn light from the input diffractive optical structure, respectively, through ±90°. The first and second gratings can therefore provide one-dimensional expansion of light in equal and opposite directions. The first and second gratings can then diffract light internally, turning it once more through 90°, so that it is coupled towards the output diffractive optical element. This can provide effective one-dimensional expansion, without introducing undesirable optical effects, before light is incident on the output diffractive optical element. It may be desirable to provide the first and third angles at close to ±45° because this can provide one-dimensional expansion in directions that are substantially orthogonal to the direction in which light is coupled towards the intermediate diffractive optical structure from the input diffractive optical structure. This can provide efficient use of space on the waveguide for a compact design, which is particularly important for augmented reality applications.

In another example the first angle may be +(45+Δ)° and the third angle may be −(45+Δ)°, where Δ is non-zero. It has been found that this can optimally diffract different portions of the angular field of view in the light coupled to the user from the output diffractive optical element, depending on whether the light was diffracted by the first or the second grating within the intermediate diffractive optical element.

This can be used to increase the angular field of view that is provided in light coupled towards the viewer by the output diffractive optical element. Generally a first angular field of view would be provided for light emanating from a first side of the output diffractive optical element and a second angular field of view would be provided for light emanating from the second side. The first and second angular fields of view preferably overlap partially, but each includes angles that the other does not. This can increase the user's perception of angular field of view to around 35° in a horizontal axis.

In one embodiment the first and second gratings may be overlaid on one another in the waveguide as a pair of crossed gratings. The use of crossed gratings may advantageously improve the compactness of the device. In another embodiment the first and second gratings may be physically spaced apart on the waveguide.

The output diffractive optical structure preferably comprises two diffractive optical elements overlaid on one another in or on the waveguide, wherein each of the two diffractive optical elements is configured to receive light from the intermediate diffractive optical element and couple it towards the other diffractive optical element which can then act as an output diffractive optical element providing outcoupled orders towards a viewer.

In one arrangement the two diffractive optical elements may be provided in a photonic crystal. In this way, the photonic crystal can simultaneously expand light in two dimensions and couple it out of the waveguide towards a viewer. Advantageously, the intermediate diffractive optical element can provide a beam of light to the output diffractive optical structure that has already been expanded in one dimension. This can improve the spatial uniformity of light from the output diffractive optical element and can help to reduce the impact of 'dark corners' which may otherwise be formed in the absence of an intermediate diffractive optical element.

According to another aspect of the invention there is provided an augmented reality or virtual reality headset comprising: a projector configured to provide augmented reality or virtual reality images; a mounting for positioning the headset on a user's head; and the device as previously defined.

Embodiments of the invention are now described, by way of example, with reference to the drawings, in which.

Figure 1:
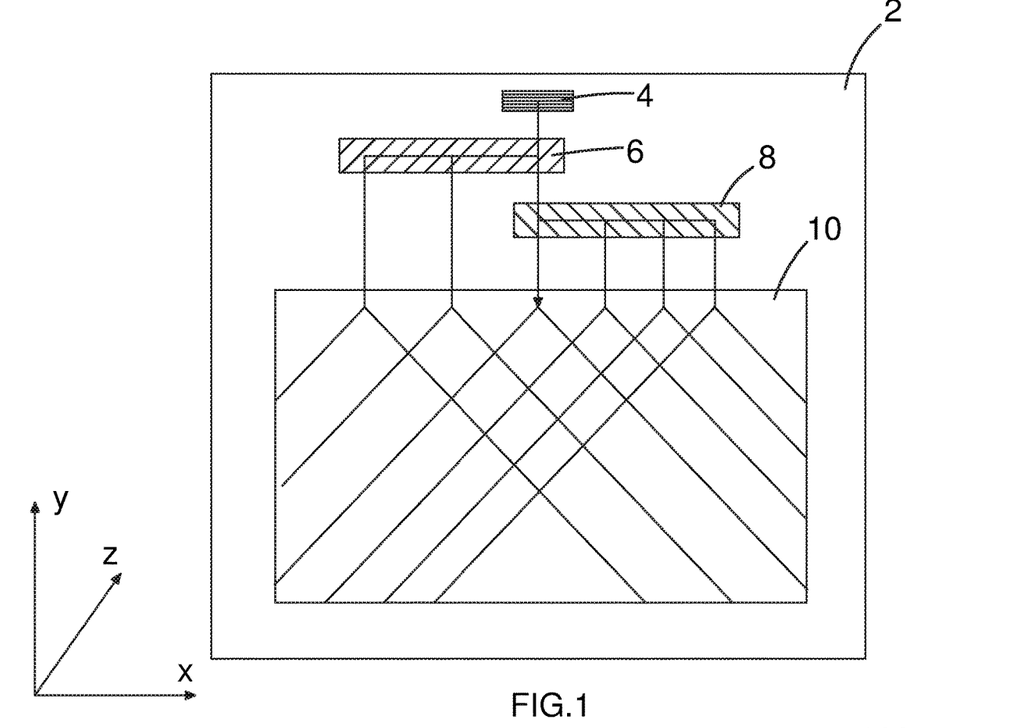
FIG. 1 is a plan view of a waveguide in an embodiment of the invention.

FIG. 1 shows a plan view of a waveguide 2 within a Cartesian reference frame (x, y, z). The waveguide 2 comprises two major, flat, parallel faces in the x-y plane and is made of a transparent medium, such as glass. An input diffraction grating 4 is provided on a surface of the waveguide 2 for coupling light from a projector (not shown) into the waveguide 2. The projector (not shown) is configured to provide light in a direction that is perpendicular to the plane of the page (i.e. parallel to the z-axis). Light that is coupled into the waveguide 2 by the input grating 4 travels by total internal reflection towards a first intermediate grating 6 and a second intermediate grating 8. Together, the first and second intermediate gratings 6, 8 may be considered as an intermediate diffractive optical element 6, 8. Light is coupled from the intermediate diffractive optical element 6, 8 towards an output element 10 that couples light out of the waveguide 2 towards a viewer in order to provide augmented reality or virtual reality images. Light is coupled out of the output element 10 towards a viewer in a direction that is perpendicular to the plane of the page (i.e. parallel to the z-axis).

The input grating 4 couples light into the waveguide 2 so that it travels in a direction that is parallel to the y-axis. The first intermediate grating 6 comprises grooves that are oriented at +45° to the y-axis, which is the direction in which light is received from the input grating 4. When light encounters the first intermediate grating 6 it undergoes a first diffraction into a first order and is turned through 90°. The diffracted light propagates in the negative x-direction, as viewed in the plan view of FIG. 1, still captured within the waveguide 2 by total internal reflection. The diffracted light interacts with the first intermediate grating 6 again, at multiple points along its length, and at each point of interaction light is either diffracted or not diffracted. Where the light is diffracted, a second diffraction with the first intermediate grating 6 turns the light once more through 90° so that it is coupled towards the output element 10 in a direction that is parallel with the y-axis. The undiffracted light continues to propagate within the waveguide 2 for interaction with the first intermediate grating 6 at a further point. In this way, the first intermediate grating 6 provides a one-dimensional expansion of the light in the x-axis. Light that propagates from the first intermediate grating 6 towards the output element 10 has been diffracted twice within the first intermediate grating 6, and turned twice through 90°. The two diffractive interactions within the first intermediate grating 6 are equal and opposite so that they are self-conjugating and optical effects introduced by the first diffraction are counter-acted by the second diffraction.

A portion of the light from the input grating 4 is not diffracted upon first interaction with the first intermediate grating 6; this portion of light is transmitted and travels within the waveguide 2 by total internal reflection towards the second intermediate grating 8 in a direction that is parallel to the y-axis. The second intermediate grating 8 comprises grooves that are oriented at −45° to the y-axis, which is the direction in which light is received from the input grating 4. When light encounters the second intermediate grating 8 some of it undergoes a first diffraction into a first order and is turned through 90°. The diffracted light propagates in the positive x-direction in the reference frame of FIG. 1, still captured within the waveguide 2 by total internal reflection. The diffracted light then encounters the second intermediate grating 8 at multiple points along its length; the light is diffracted again and turned through 90° so that it propagates towards the output element 10 in a direction that is parallel to the y-axis. In this way, the second intermediate grating 8 provides a one-dimensional expansion of the light in the positive x-axis, which is the opposite direction to the first intermediate grating 6. Light that propagates from the second intermediate grating 8 towards the output element 10 has been diffracted twice within the second intermediate grating 8, and turned twice through 90°.

A portion of the light that is incident on the second intermediate grating 8 is not diffracted upon first interaction. This component of the light continues to propagate in a direction that is parallel with the y-axis under total internal reflection towards the output element 10. Thus, a central portion of the light received at the output element 10 is neither diffracted by the first intermediate grating 6 nor the second intermediate grating 8.

The output element 10 in this embodiment is an expanding diffractive optical exit pupil, as described in WO 2016/020643. The output element 10 therefore comprises a pair of crossed linear gratings, or a photonic crystal structure. In both cases, the output element 10 comprises two diffractive optical elements overlaid on one another in or on the waveguide 2. Each of the two diffractive optical elements in the output element 10 is configured to receive light in a direction that is substantially parallel to the y-axis from either the first intermediate grating 6 or the second intermediate grating 8. Each diffractive optical element within the output element 10 can then couple the received light towards the other diffractive optical element in the pair which can then act as an output diffractive optical element which couples light out of the waveguide 2 towards a viewer along the z-axis.

The two diffractive optical element overlaid on one another in the output element 10 are provided with diffractive optical features at ±30° to the y-axis, which is the direction in which light is received from the first intermediate grating 6 and the second intermediate grating 8. Thus, light is diffracted by the respective overlaid diffractive optical features at ±60° to the y-axis. Light therefore expands within the output element 10 within a v-shaped cone, contained between ±60° from the point of first interaction with the output element 10. By expanding the light in one-dimension using the first intermediate grating 6 and the second intermediate grating 8 it is possible to provide a plurality of such v-shaped cones, emanating from respective points along the x-axis at the top of the output element 10. In this way, an improved spatial distribution of light can be provided within the output element 10. This is achieved without introducing angular or chromatic dispersion because two equal and opposite diffractive interactions occur within each of the first intermediate grating 6 and the second intermediate grating 8; this means that any adverse optical effects created by the first diffractive interaction in the first intermediate grating 6 are counteracted by the second diffractive interaction in the first intermediate grating 6 (and likewise for the second intermediate grating 8).

The diffraction efficiencies of the first and second intermediate gratings 6, 8 can be controlled in order to improve the uniformity of the brightness of the light coupled towards the output element 10 at different positions with respect to the x-axis. This can be achieved if a coating thickness or feature height in the gratings 6, 8 is made proportional to position along the x-axis, away from the central point at which light is received from the input grating 4. By increasing diffraction efficiency at positions away from the central point, it is possible to increase the relative proportion of light that is diffracted rather than undiffracted. Thus, although the absolute brightness of the beam may decrease in the x-direction as orders are turned towards the output element 10, a higher proportion of light can be diffracted at positions with a greater separation in the x-direction from the central point. This can ensure an even brightness along the x-axis for one-dimensionally expanded light from the first and second intermediate gratings 6, 8.

Figure 2:
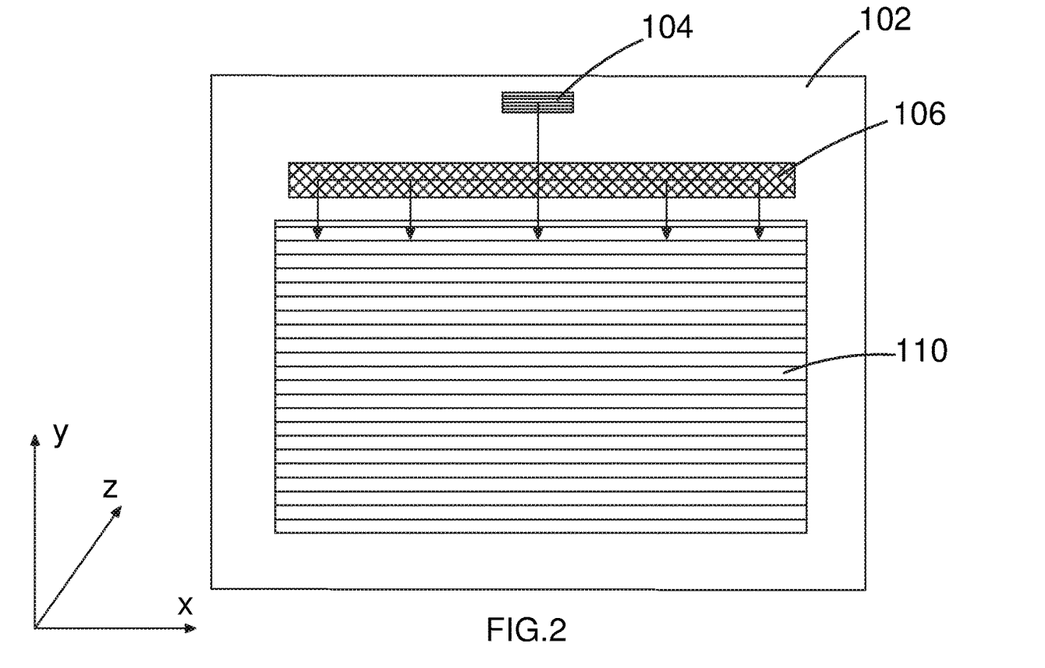
FIG. 2 is a plan view of a waveguide in another embodiment of the invention.

FIG. 2 shows a plan view of another waveguide 102. In this arrangement a single intermediate grating 106 is provided between the input grating 104 and the output element 110. The input grating 104 is provided on a surface of the waveguide 102 for coupling light from a projector (not shown) into the waveguide 102. The intermediate grating 106 in this embodiment comprises a pair of linear gratings overlaid on one another in the waveguide 102. These crossed gratings are provided, respectively, with grooves at angles of ±45° to the y-axis, which is the direction in which light is received at the intermediate grating 106 from the input grating 104. The crossed gratings can be provided on the same surface of the waveguide 2 or on opposite surfaces, in different embodiments.

The linear grating with grooves at +45° to the y-axis diffracts light from the input grating 104 so that it is turned through 90° such that it propagates in the negative x-direction in the reference frame of FIG. 2 (i.e. to the left). This light would then be diffracted again by the grooves that are at +45° so that the light is turned once more through 90° and is coupled towards the output element 110 in a direction that is parallel to the y-axis.

The linear grating with grooves at −45° would diffract light so that it is turned through 90° such that it propagates in the positive x-direction. This light would then be diffracted again by the grooves that are at −45° so that the light is turned once more through 90° and is coupled towards the output element 110 in a direction that is parallel to the y-axis. In this way, the intermediate grating 106 can provide a one-dimensional expansion of light in the positive and negative x-direction for a beam of light that is received centrally from the input grating 104.

The use of a crossed grating as an intermediate grating 106 in the embodiment of FIG. 2 provides the advantage of compactness, which is particularly desirable for an augmented reality display. In some arrangements, however, spatially separated gratings (in the y-axis) may be preferred, such as the first and second intermediate gratings 6, 8 in the embodiment of FIG. 1. This is because a second diffraction within the crossed grating would diffract some light in the positive y-axis, away from the output element 110. This would occur for light that is first diffracted by the grooves at +45° and subsequently diffracted by the grooves at −45° (and vice-versa). This is likely to result in a loss of light in the system, which, without application of countermeasures, may reduce efficiency.

The output element 110 in this embodiment is a linear grating, provided across a two-dimensional area with grooves that are parallel to the x-axis. The output element 110 of the embodiment shown in FIG. 2 may be provided together with the first and second intermediate gratings 6, 8 of the embodiment shown in FIG. 1. Likewise, the output element 10 of the embodiment shown in FIG. 1 may be provided with the intermediate grating 106 of the embodiment shown in FIG. 2.

Figure 3:
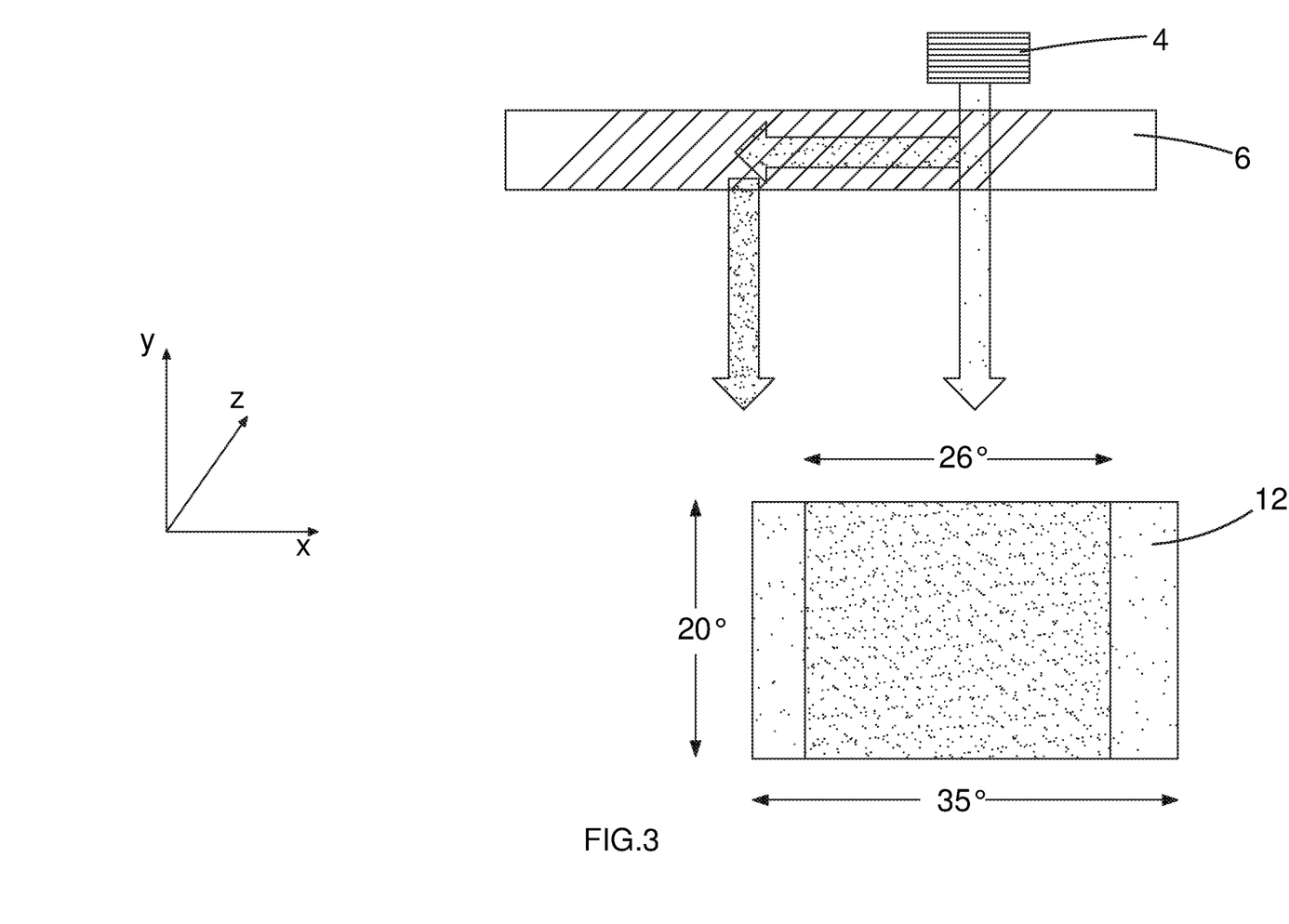
FIG. 3 is a schematic plan view of a portion of the waveguide shown in FIG. 1.

FIG. 3 is a schematic view of a portion of the waveguide 2 shown in FIG. 1. It has been found that the double diffraction generated by the first intermediate grating 6 (and the second intermediate grating 8) can, in some situations, cause a slight reduction in the angular field of view, in comparison with light that propagates directly to the output element 10 without being diffracted by the first intermediate grating 6 or the second intermediate grating 8. An eye box 12 is shown in angular space. The eye box 12 represents the angular field of view of the light output from the output element 10 in FIG. 1. A wide angular field of view is achieved for light that has not been diffracted, approaching 35° in the x-axis and 20° in the y-axis (i.e. horizontally and vertically from the perspective of a viewer). It has been found that the double diffraction of the light from the input grating 4 by the first intermediate grating 6 can cause higher angles to escape total internal reflection within the waveguide 2. This can cause a reduction in angular field of view for light that has been expanded in one-dimension by the first intermediate grating 6 or the second intermediate grating 8. The angular field of view for one-dimensionally expanded light from the first and second intermediate gratings 6, 8 shown in FIG. 1 may be around 26°. Without correction this may create some undesirable viewing conditions for a user because light that has not been diffracted by the first or second intermediate gratings 6, 8, and goes on to be diffracted only by the output element 10, can have a wide angular field of view, whereas light that has been diffracted by the first and second intermediate gratings 6, 8 can have a reduced field of view, resulting in non-uniformities in the left and right regions of the full angular image.

Figure 4:
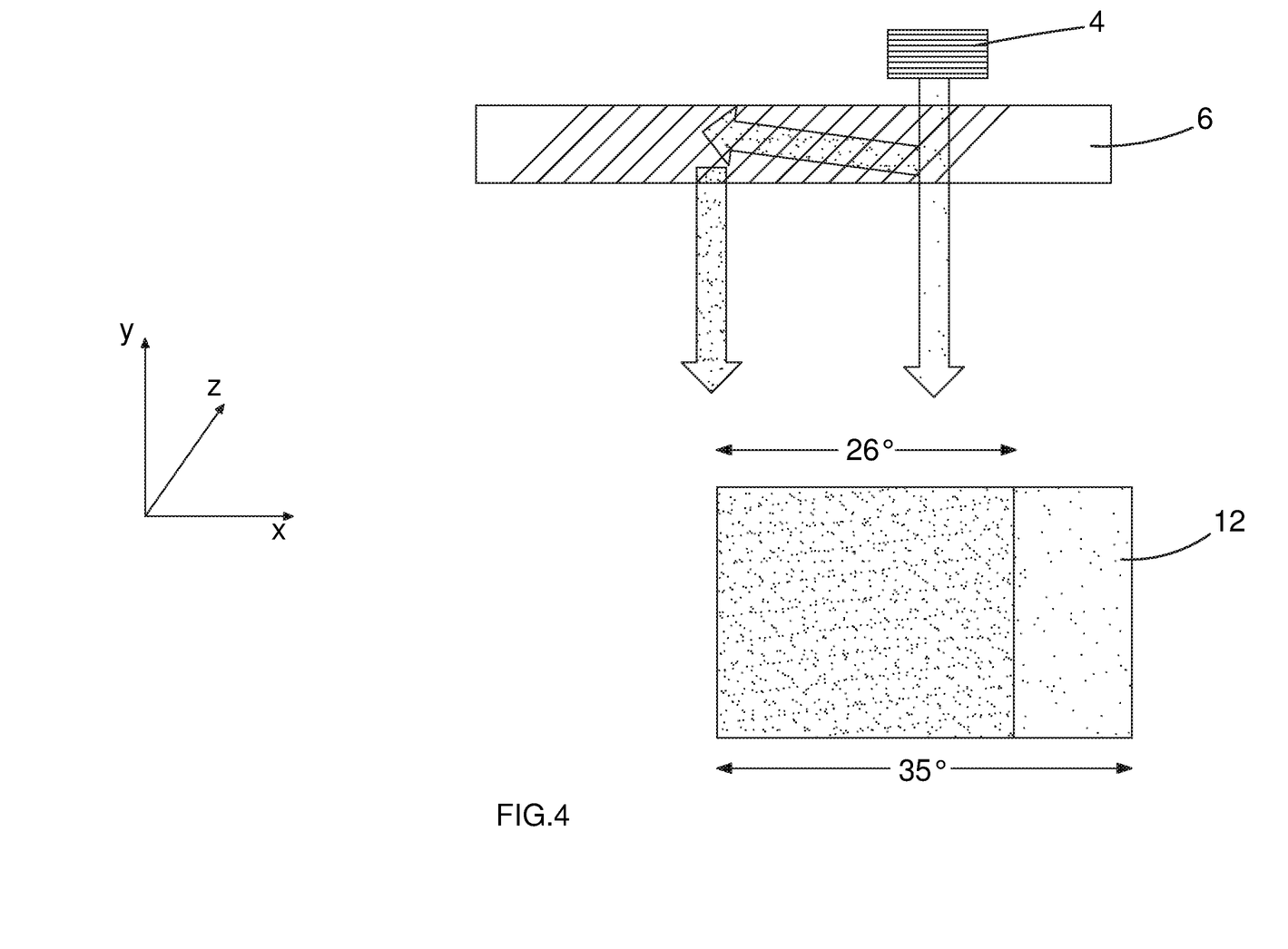
FIG. 4 is a schematic view of a portion of a waveguide in another embodiment of the invention.

FIG. 4 is a schematic view of a portion of a waveguide in another embodiment of the invention. In this example, the grooves of the first intermediate grating 6 are oriented at an angle of +(45+Δ)° to the y-axis, which is the direction in which light is received from the input grating 4. Light is diffracted twice by the first intermediate grating 6 before it is coupled towards the output element 10. In this configuration the angular field of view for doubly diffracted light is still reduced in comparison with light that has not been diffracted. However, the angular field of view is shifted within the eye box 12. In particular, the angular field of view is shifted towards the negative x-direction. This means that light from the first intermediate grating 6, which generally occupies the left hand side of the output element 10, is shifted towards the left.

Figure 5:
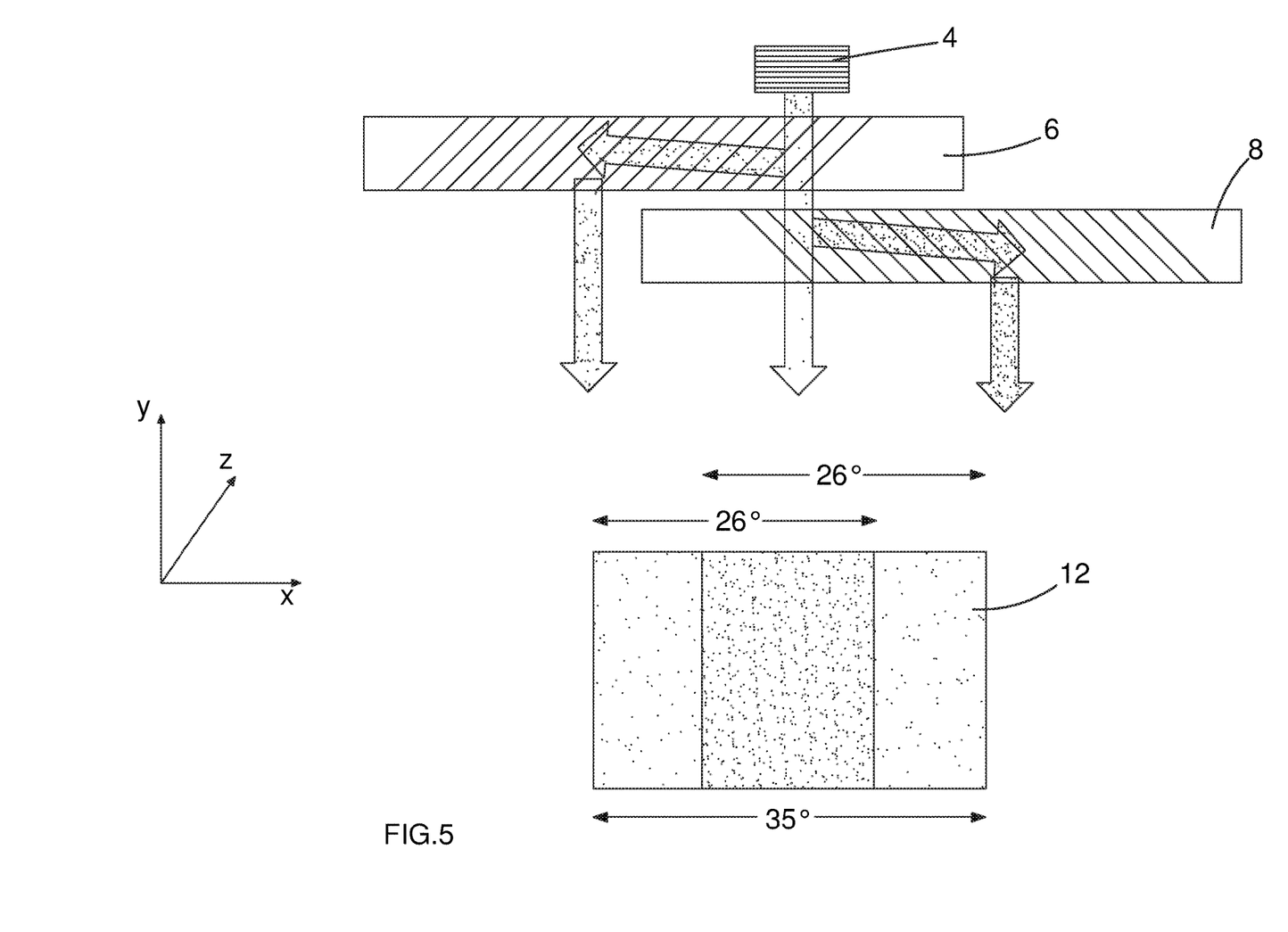
FIG. 5 is a schematic view of a portion of a waveguide in another embodiment of the invention.

FIG. 5 is a schematic view of a portion of a waveguide in another embodiment of the invention. In this example, the grooves of the first intermediate grating 6 are oriented at an angle of +(45+Δ)° to the y-axis. The grooves of the second intermediate grating 8 are oriented at an angle of −(45+Δ)° to the y-axis. In this way, doubly diffracted light from the first intermediate grating 6 is provided with an angular field of view of around 26°, shifted to the left, whereas doubly diffracted light from the second intermediate grating 8 is provided with an angular field of view of around 26°, shifted to the right. These angular fields of view overlap in the eye box 12 so that, together, they provide an overall field of view of around 35°, which is the same as the angular field of view for light that has not been diffracted. Thus, the user's eye perceives a wide angular field of view of around 35°, even though a smaller angular field of view is provided from the first and second intermediate gratings 6, 8. The "missing" angles from the first and second intermediate gratings 6, 8, can be provided by the portion of the light that propagates directly towards the output element 10 without undergoing any diffraction by the first or second intermediate gratings 6, 8.

The value of Δ may be around 2° in some embodiments and around 5° in other embodiments. It is considered envisaged that values of Δ may be used that are non-zero and less than 10°. The double diffraction is self-conjugating in both the first and second intermediate gratings 6, 8, which allows these gratings to be provided with grooves at different angles.

Figure 6A:
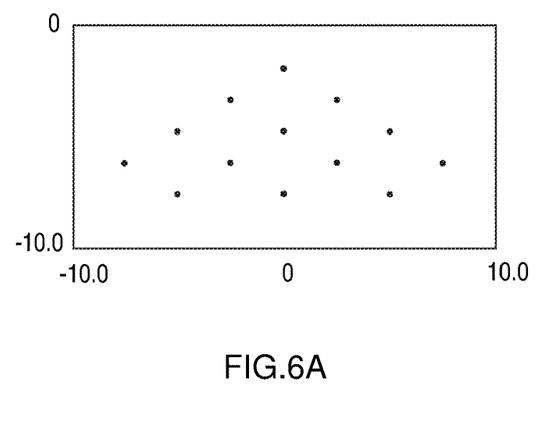
FIG. 6A shows the spatial positions of the rays outcoupled towards a user's eye within a 20 mm×10 mm region, based on the ray path shown in FIG. 6B.
Figure 6B:
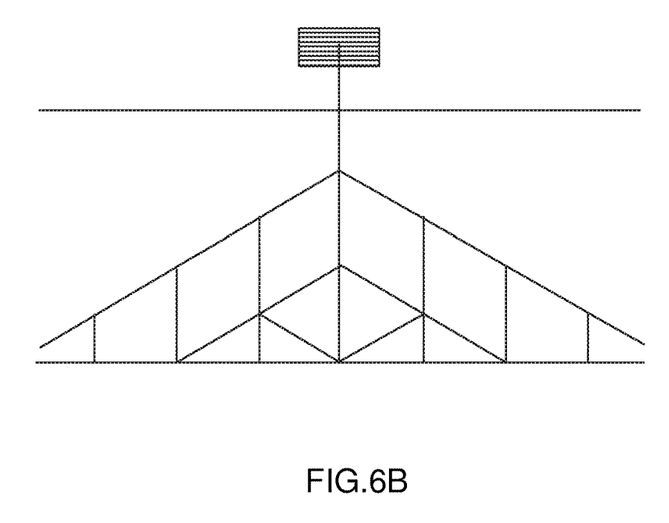
FIG. 6B is a schematic view of the ray path taken using an input grating and an output element.

FIG. 6B is a schematic view of the ray path taken using an input grating and an output element as described in WO 2016/020643. FIG. 6A shows the positions of the interactions on the output element 10 which produce an outcoupling ray to the eye. The area in FIG. 6A has been limited to 20 mm (horizontal)×10 mm (vertical) to retain clarity. As can be seen, the rays are expanded in two dimensions and simultaneously coupled out of the waveguide in a hexagonal array within a v-shaped area, since light is diffracted between angles of ±60° to the y-axis from the point of first interaction with the output element.

Figure 7A:
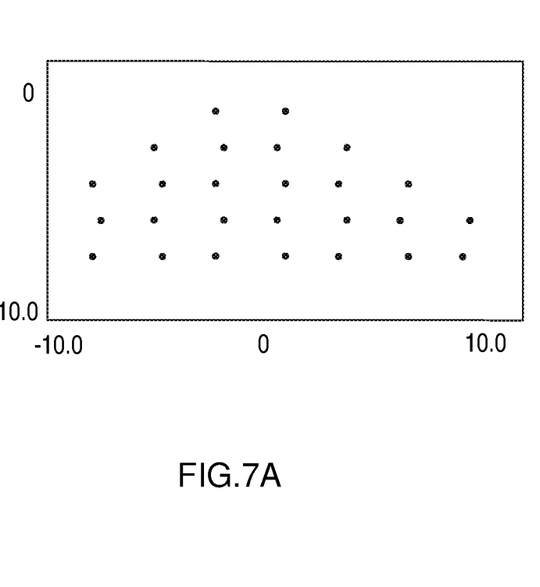
FIG. 7A shows the spatial positions of the rays outcoupled towards a user's eye within a 20 mm×10 mm region, based on the ray path shown in FIG. 7B.
Figure 7B:
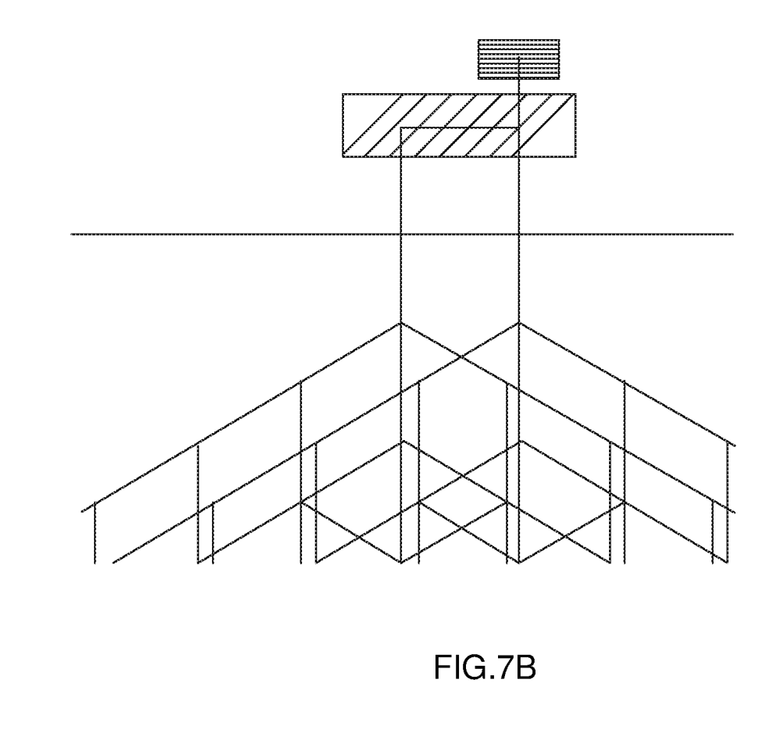
FIG. 7B is a schematic view of the ray path taken in the waveguide shown in FIG. 1.

FIG. 7B is a schematic view of the ray path taken in the waveguide shown in FIG. 1. FIG. 7A shows positions of the interactions on the output element 10 which produce an outcoupling ray to the eye within the same area as FIG. 6A. In this situation, a plurality of v-shaped expanding cones are provided, each emanating from a respective point of first interaction with the output element 10. Beams are coupled out of each v-shaped cone in a hexagonal array. The beam has been expanded in one dimension in the x-axis and this improves the spatial uniformity of the output from the eye box because the hexagonal arrays from respective v-shaped cones are partially overlapping.

Figure 8A:
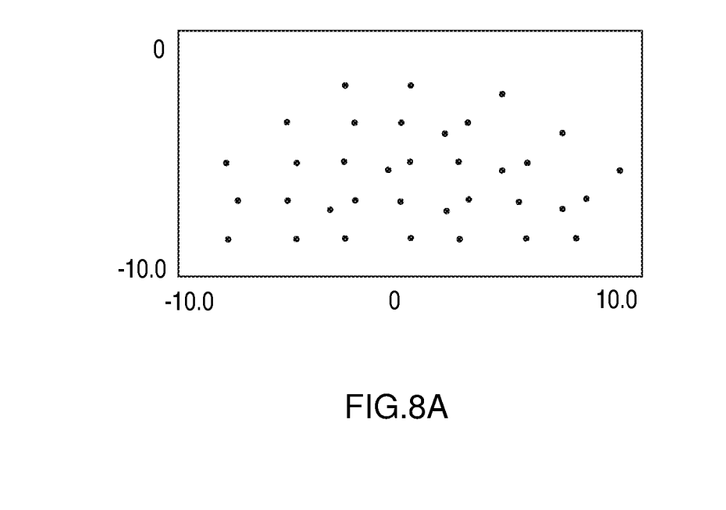
FIG. 8A shows the spatial positions of the rays outcoupled towards a user's eye within a 20 mm×10 mm region, based on the ray path shown in FIG. 8B.
Figure 8B:
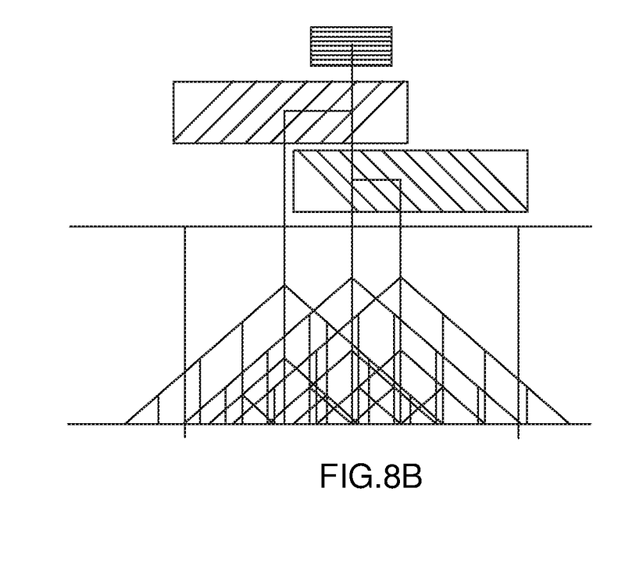
FIG. 8B is a schematic view of the ray path taken in the waveguide shown in FIG. 5.

FIG. 8B is a schematic view of the ray path taken in the waveguide shown in FIG. 5, in an embodiment where Δ=5°. FIG. 8A shows the positions of the interactions on the output element 10 which produce an outcoupling ray to the eye within the same area as FIGS. 6A and 7A. As can been seen, the number of points where light is coupled out of the output element is increased. This advantageously improves a user's experience in an augmented reality or virtual reality device.

The invention claimed is:

1. A device for use in an augmented reality or virtual reality display, the device comprising:
   a waveguide;
   an input diffractive optical structure configured to receive light from a projector and couple the received light into the waveguide;
   an output diffractive optical structure; and
   an intermediate diffractive optical structure configured to receive light from the input diffractive optical structure, provide a one-dimensional expansion of the received light, and couple the expanded light towards the output diffractive optical structure, wherein the output diffractive optical structure is configured to receive light from the intermediate diffractive optical structure and couple it towards a viewer;
   wherein the intermediate diffractive optical structure comprises first and second linear gratings, wherein the first grating comprises diffractive features that are oriented at a first angle to light received from the input diffractive optical structure to provide a first diffraction and a second diffraction within the first grating in order to couple light towards the output diffractive optical structure, wherein the first diffraction couples light from the input diffractive optical structure, still captured within the waveguide by total internal reflection, towards the first grating's diffractive features at a second angle so that the second diffraction is provided at a plurality of spaced positions in the first grating thereby providing the one-dimensional expansion of light, wherein the second diffraction couples light towards a first side of the output diffractive optical structure;
   wherein the second grating comprises diffractive features that are oriented at a third angle to light received from the input diffractive optical structure to provide a third diffraction and a fourth diffraction within the second grating in order to couple light towards the output diffractive optical structure, wherein the third diffraction couples light from the input diffractive optical structure, still captured within the waveguide by total internal reflection, towards the second grating's diffractive features at a fourth angle so that the fourth diffraction is provided at a plurality of spaced positions in the second grating thereby providing the one-dimensional expansion of light, wherein the fourth diffraction couples light towards a second side of the output diffractive optical structure; and
   wherein the first angle is +(45+Δ°) and the third angle is −(45+Δ°), so that a first angular field of view is provided for light emanating from the first side of the output diffractive optical structure and a second angular field of view is provided for light emanating from the second side of the output diffractive optical structure, wherein the first and second angular fields of view overlap partially, but each includes angles that the other does not;
   wherein Δ is less than 10°.

2. The device of claim 1, wherein the first and second angles are substantially equal.

3. The device of claim 1, wherein the third and fourth angles are substantially equal.

4. The device of claim 1, wherein the first angle and the third angle are substantially equal and opposite.

5. The device of claim 1, wherein the first and second gratings are at least partially overlaid on one another in the waveguide as a pair of crossed gratings.

6. The device of claim 1, wherein the first and second gratings are physically spaced apart on the waveguide.

7. The device of claim 1, wherein the output diffractive optical structure comprises two diffractive optical elements overlaid on one another in or on the waveguide, wherein each of the two diffractive optical elements is configured to receive light from the intermediate diffractive optical structure and couple it towards the other of the two diffractive optical elements which can then act as an output diffractive optical element providing outcoupled orders towards a viewer.

8. The device of claim 7, wherein the two diffractive optical elements are provided in a photonic crystal.

9. The device of claim 1, wherein the input diffractive optical structure is a diffraction grating.

10. An augmented reality or virtual reality headset comprising:
    a projector configured to provide augmented reality or virtual reality images;
    a mounting for positioning the headset on a user's head; and
    the device of claim 1.

11. The device of claim 1, wherein Δ is around 2° within ordinary rounding techniques.

12. The device of claim 1, wherein Δ is around 5° within ordinary rounding techniques.

13. A method for presenting light to a viewer of an augmented reality or virtual reality display, the method comprising:
    projecting the light from a projector;
    at an input diffractive optical structure, receiving the light and coupling the received light into a waveguide;
    at an intermediate diffractive optical structure:
       receiving the light from the input diffractive optical structure;
       performing a one-dimensional expansion of the received light; and
       coupling the expanded light towards an output diffractive optical structure,
    wherein the intermediate diffractive optical structure comprises first and second linear gratings,
       wherein the first grating comprises diffractive features that are oriented at a first angle to light received from the input diffractive optical structure to provide a first diffraction and a second diffraction within the first grating in order to couple light towards the output diffractive optical structure, wherein the first diffraction couples light from the input diffractive optical structure, still captured within the waveguide by total internal reflection, towards the first grating's diffractive features at a second angle so that the second diffraction is provided at a plurality of spaced positions in the first grating thereby providing the one-dimensional expansion of light, wherein the second diffraction couples light towards a first side of the output diffractive optical structure;
       wherein the second grating comprises diffractive features that are oriented at a third angle to light received from the input diffractive optical structure to provide a third diffraction and a fourth diffraction within the second linear grating in order to couple light towards the output diffractive optical structure, wherein the third diffraction couples light from the input diffractive optical structure, still captured within the waveguide by total internal reflection, towards the second grating's diffractive features at a fourth angle so that the fourth diffraction is provided at a plurality of spaced positions in the second grating thereby providing the one-dimensional expansion of light, wherein the fourth diffraction couples light towards a second side of the output diffractive optical structure; and at the output diffractive optical structure, receiving the light from the intermediate diffractive optical structure and coupling the light toward a viewer;

wherein the first angle is $+(45+\Delta°)$ and the third angle is $-(45+\Delta°)$, so that a first angular field of view is provided for light emanating from the first side of the output diffractive optical structure and a second angular field of view is provided for light emanating from the second side of the output diffractive optical structure, wherein the first and second angular fields of view overlap partially, but each includes angles that the other does not;

wherein $\Delta$ is less than 10°.

14. The method of claim 13, wherein the first and second angles are substantially equal.

15. The method of claim 13, wherein the third and fourth angles are substantially equal.

16. The method of claim 13, wherein the first angle and the third angle are substantially equal and opposite.

17. The method of claim 13, wherein the first and second gratings are at least partially overlaid on one another in the waveguide as a pair of crossed gratings.

18. The method of claim 13, wherein the first and second gratings are physically spaced apart on the waveguide.

19. The method of claim 13, wherein $\Delta$ is around 2° within ordinary rounding techniques.

20. The method of claim 13, wherein $\Delta$ is around 5° within ordinary rounding techniques.

* * * * *